Figure 11:
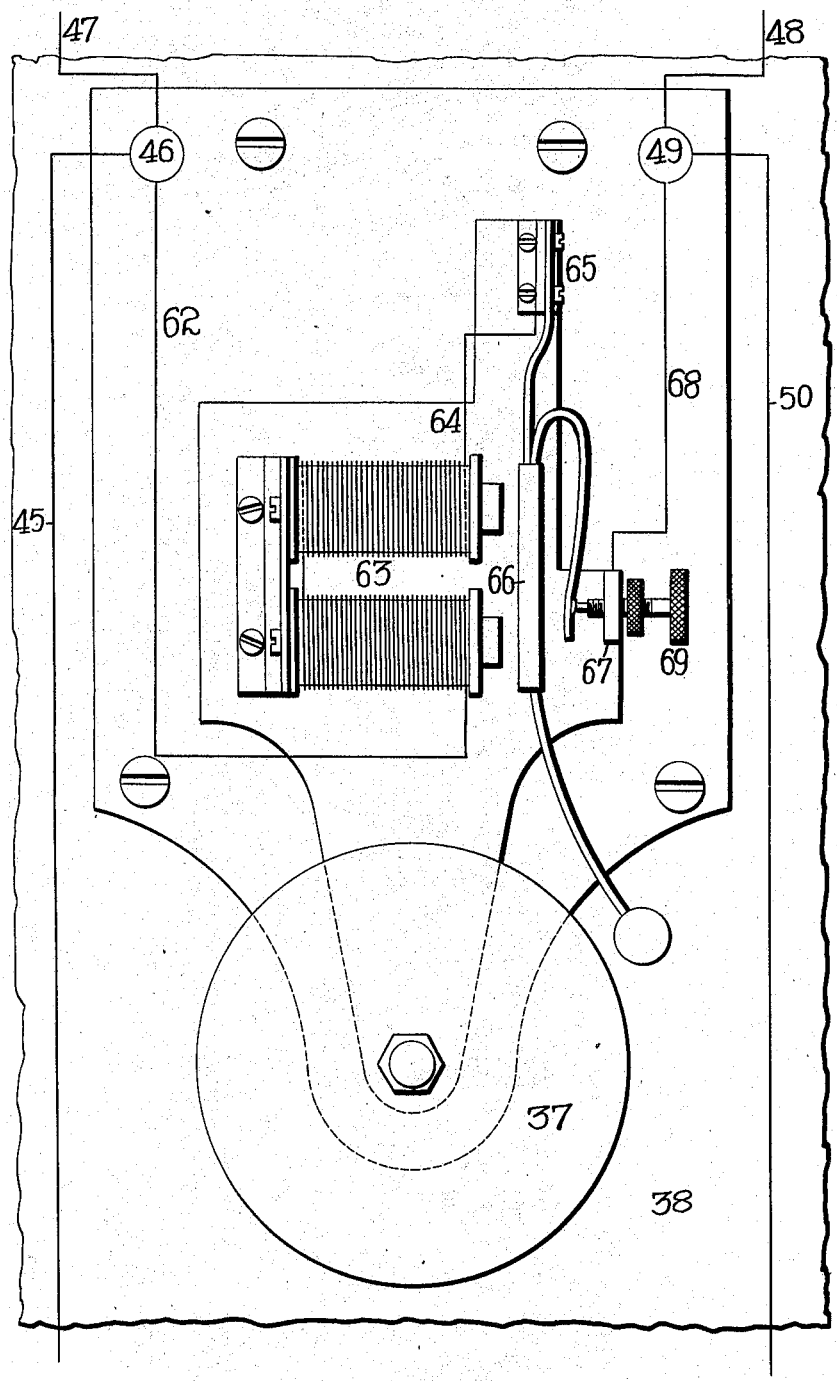

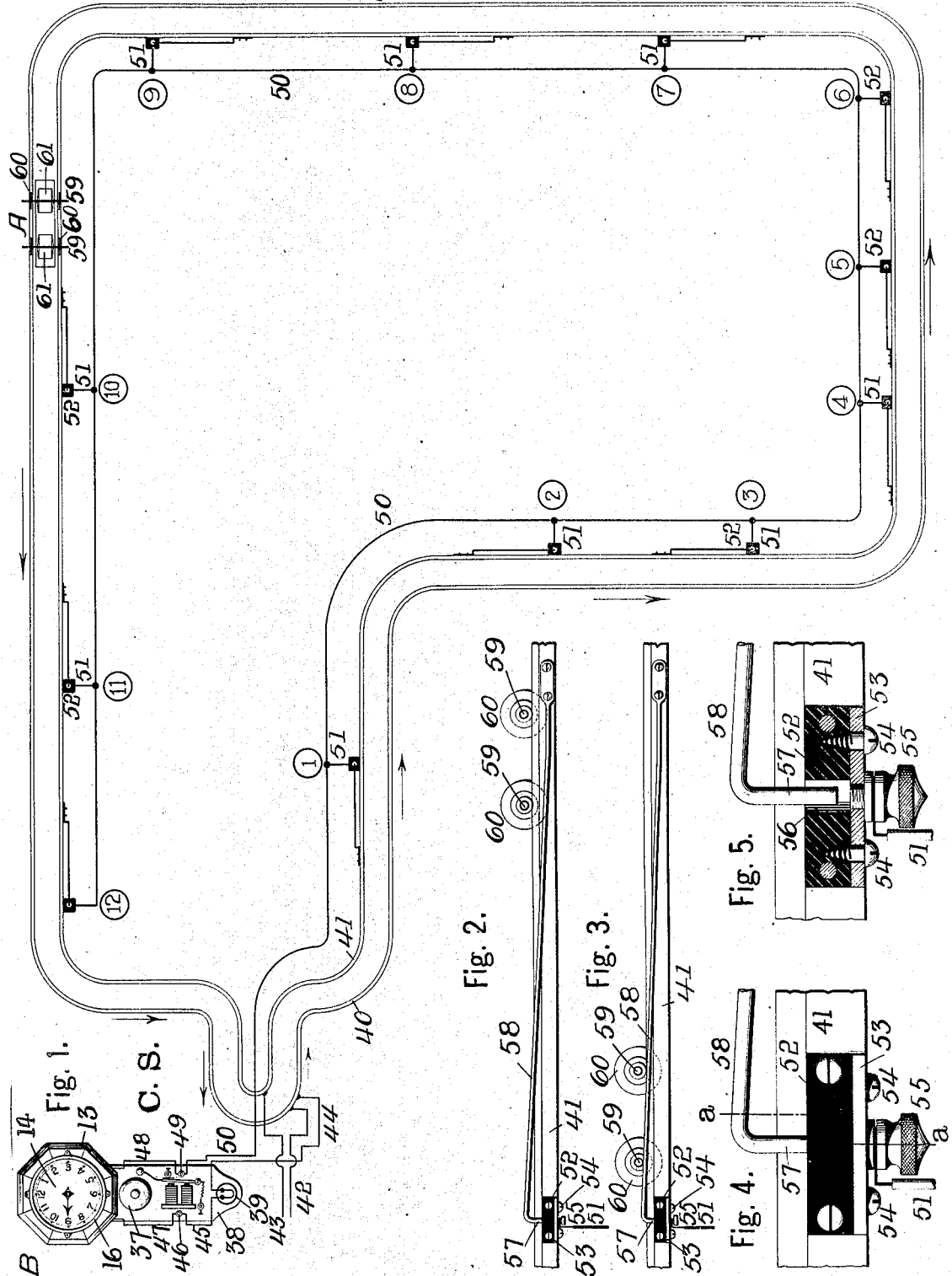

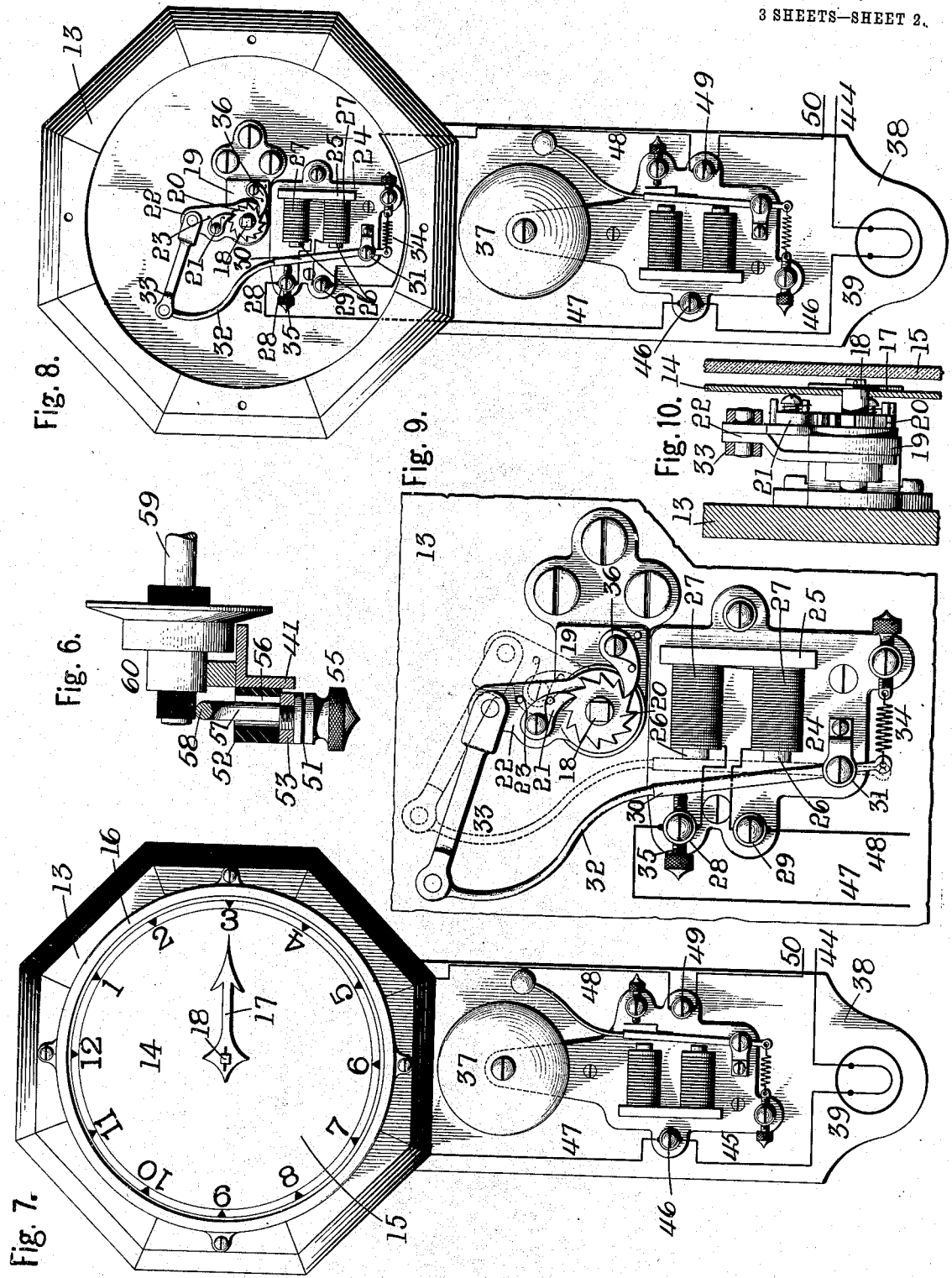

W. C. CARR.
TRANSPORTATION SYSTEM.
APPLICATION FILED SEPT. 25, 1906.

899,588.

Patented Sept. 29, 1908.

3 SHEETS—SHEET 3.

Witnesses.
L. M. Saugster.
George A. Neubauer

William C. Carr. Inventor.
By C. J. Saugster
Attorneys

UNITED STATES PATENT OFFICE.

WILLIAM C. CARR, OF BUFFALO, NEW YORK.

TRANSPORTATION SYSTEM.

No. 899,588.    Specification of Letters Patent.    Patented Sept. 29, 1908.

Application filed September 25, 1906. Serial No. 336,146.

*To all whom it may concern:*

Be it known that I, WILLIAM C. CARR, a citizen of the United States, residing at Buffalo, in the county of Erie and State of New York, have invented a certain new and useful Improved Transportation System, of which the following is a specification.

This invention relates to an improved transportation system, which is chiefly designed for collecting and distributing mail and packages in rural districts.

The invention comprises a loop track, having a main or central station and a series of collecting and delivering points or branch stations at intervals, a collecting and delivering car, and an indicator at the central station which automatically registers the passage of the car as it passes each branch station.

The principal object of the invention is to enable the operator at the central station to determine the approximate position of the car.

The invention also relates to certain details of construction all of which will be fully and clearly hereinafter described and claimed reference being had to the accompanying drawings in which,—

Figure 1, is a diagrammatic plan of the improved transportation system showing the track, the central station the branch stations, the car, the indicator and the circuit closers. Fig. 2, is a side view of one of the circuit closing devices and a fragment of the track, showing the wheels of a car approaching and about to operate the circuit closer. Fig. 3, is a view similar to Fig. 2, showing the circuit closer being operated by the wheels of the car to make the contact and complete the circuit. Fig. 4, is an enlarged fragmentary side view of the circuit closing device. Fig. 5, is an enlarged vertical longitudinal section through the insulating block and the contact plate secured to the side of a rail, showing a fragment of the circuit closer. Fig. 6, is a vertical transverse section through the circuit closing device on line *a—a*, Fig. 4. Fig. 7, is an enlarged front view of the indicator. Fig. 8, is a similar view of the indicator with the dial removed to show the interior. Fig. 9, is an enlarged detached front view of the mechanism for operating the indicator hand of the indicator, showing the mechanism in its normal position in full lines and in the position it assumes when the electrical circuit is completed in dotted lines. Fig. 10, is a fragmentary section through the indicator casing showing an edge view of the mechanism for operating the indicator hand. Fig. 11 is an enlarged view showing the wiring of the electric bell.

In referring to the drawings in detail like numerals designate like parts.

The track is in the form of an endless loop having two parallel rails.

In the diagrammatic view shown in Fig. 1, a main station is located at one point of the loop and designated by the letters C. S., and a series of branch stations are arranged at suitable intervals around the loop and designated respectively by the numerals 1 to 12 inclusive.

The collecting and distributing car which is similar to that described in my companion application, Serial Number 334,884, filed September 17th 1906, is designated by the letter A on Fig. 1.

A position indicator for determining the approximate position of the car on the loop is located at the central station and is shown on Fig. 1, and is designated as a whole on said figure by the letter B. The indicator is also shown in Figs. 7, 8, 9 and 10, to which reference will be had hereinafter for a description in detail; the component parts thereof being designated by proper numerals on said figures.

The indicator is automatically operated by the car at each branch station by electrical means which causes the indicator hand or pointer to revolve and point to the number on the dial corresponding to the number of the branch station which the car has just passed.

In Fig. 1, it will be noted that the car A has just passed branch station "9" and that the indicator hand points to the number "9" on the dial.

The indicator case 13 is preferably formed as shown in Figs. 7 and 8, being octagonal in shape and having a circular opening in the front thereof which is closed by a circular dial 14. The dial has a plurality of equally spaced points arranged in a circular row, the points being numbered consecutively and being equal to the number of branch stations along the line, in the present instance, twelve. The dial is covered with a glass 15, which is held by an annular metal ring 16, fastened to the front of the case 13, sufficient space being left between the dial and the glass to permit the operation of the indicating hand 17, see Fig. 10. This pointer or indicating hand is supported by a shaft 18, which is journaled in a bracket 19, located within the interior of the case 13, and fastened to the back thereof by screws, see Figs. 8, 9 and 10. A ratchet wheel 20 is secured to the shaft 18, near its outer end and is operatively engaged by a pawl 21, which is carried by a rock arm 22. This rock arm is loosely mounted upon the shaft 18, and is forked as shown in Fig. 10, so as to straddle the bracket 19. By this construction lateral or end movement of the rock arm is prevented. The pawl 21, is maintained in engagement with the ratchet 20, by a spring 23, see Fig. 9. The rock arm is operated so as to rotate the shaft by an electromagnet which is constructed as shown in Figs. 8 and 9.

A base 24, is fastened by screws to the interior of the case 13, below the bracket 19, and supports a yoke 25, of metal such as iron, which is a good conductor of electricity. This yoke carries two iron cores 26, which are surrounded by wire coils 27. These coils are made of one continuous piece of wire of good conductive quality, one of the ends of said wire leading to and being fastened to a binding post 28, and the other end leading to and being fastened to a binding post 29, see Fig. 9. An armature 30, is pivotally supported at one end by a bracket 31, in such position so as to be capable of contacting with the projecting ends of both the cores 26, see Fig. 9. A rod 32, extends from the upper end of the armature and is connected to the rock arm 22, by a connecting link 33. A spring 34, returns the armature to its normal position when the electrical circuit is broken, the movement of the armature being limited by a stop screw 35. A pawl 36, pivoted to the bracket 19, engages with the ratchet 20, and prevents backward rotation of the shaft 18. An electric bell 37, is secured to a board or other support 38, which depends from the indicator case 13, and an incandescent electric light 39, is secured to the support 38, below the bell in the manner shown in Figs. 7 and 8.

The electro-magnet for moving the indicator hand, the bell 37 and the incandescent light 39, are connected to the track by conducting wires as shown in Figs. 1 and 8.

The track upon which the car travels is in the form of an endless loop and is composed of two rails 40 and 41, which extend parallel to each other. Electricity is conducted to the rails by wires 42 and 43, which lead from any suitable source of electric energy. By this means it is to be noted that one or both of the rails are electrically energized so that the rails serve to support the car and also supply electric power to operate the indicator.

A wire 44, leads from the rail 40, to the incandescent light 39, and a wire 45, leads from the light to a binding post 46, on the electric bell 37. A branch wire 47, leads from the binding post 46, to the binding post 28, of the electro-magnet within the indicator case 13. A wire 48, connects the binding post 29, with a binding post 49, on the electric bell 37, and a line wire 50, leads from the binding post 49, and parallels the track. This line wire 50, is connected by a branch wire 51, to a circuit closing device located at each branch station. This circuit closing device is constructed as shown in Figs. 2 to 6, inclusive.

A block 52, of insulating material is fastened by screws to the side of the rail 41, and has a metal contact plate 53, secured to its bottom surface by screws 54. This plate 53, is fastened to the block 52, in such a manner so as not to contact with the rail 41, see Fig. 6. The branch wire 51, is connected with the contact plate by means of a binding screw 55.

The insulating block 52, is provided with a central vertical opening 56, in which the end 57, of a comparatively long spring rod 58, is inserted. The rod 58, is fastened at the other end to the side of the rail 41, as shown in Figs. 1, 2 and 3, and parallels said rail in a longitudinal direction, but being bent obliquely upward so as to project above the rail. The end 57, is bent vertically downward so as to enter the opening 56, and almost but not quite contact with the plate 53, when the rod 58, is in its normal position, Figs. 2, 4 and 5.. The rod 58, is depressed so as to contact with the plate 53, by the passing of the car A, as shown in Figs. 3 and 6.

The car A has two axles 59, which have wheels 60 mounted upon their ends, said wheels being insulated from the axles as shown in Fig. 6. One end of one of the axles projects beyond the wheel as shown in said Fig. 6. As the car passes through a branch station, this projecting end of the axle contacts with the rod 58, in the manner shown in Figs. 3 and 6, and depresses said rod, thereby bringing the extremity of the vertical end portion 57, into contact with the contact plate 53, and closing the circuit. This operates the indicator in the following manner. The rails 40 and 41, are electrically charged by means of the wires 42 and 43, as hereinbefore described. The car A, is driven by motors 61, mounted upon the axles 59, the circuit between the rails 40 and 41 being completed through the motors. When the car A, depresses one of the circuit closing rods 58, the current passes from the rail 41, through the rod 58, to the contact plate 53. From thence it is conducted through the branch wire 51, line wire 50, binding post 49, wire 48, binding post 29, coil 27, binding post 28, wire 47, binding post 46, wire 45, incandescent light 39, wire 44, to the rail 40. This completes the circuit and energizes the electro-magnet within the indicator case which attracts the armature 30. The movement of the armature rocks the arm 22, as shown in dotted line in Fig. 9, and gives the shaft 18, a partial rotation thereby moving the indicator hand 17 forward one point. The current also operates the electric bell 37, and lights the incandescent lamp 39, thereby calling the attention of the operator at the central station to the fact that the car has passed through a station and continued on its way.

The electric bell 37, is connected to the binding posts 46 and 49, in the usual manner, as shown in Fig. 11. A wire 62, leads from the binding post 46, to the magnet 63, of the bell, and a wire 64, leads from the magnet 63, to the support 65, of the armature 66. The binding post 49, is connected with the contact pillar 67, by a wire 68. The contact screen 69, completes the circuit between the pillar 67, and the armature 66.

In operation, when the circuit is completed between the rod 58, and the contact plate 53, the current passes through the binding posts 46 and 49, as heretofore described and energizes the magnet 63, of the ball 37, which attracts the armature 66, and rings the bell.

When the car passes by the station and releases the rod 58, it returns to its normal position Fig. 2, and breaks the circuit to the indicator thereby permitting the spring 34, to return the armature 30, to its normal position.

When the car reaches the next station the operation is repeated and so on until the car completes its travel 27 and reaches the central station.

I claim as my invention—

1. In a transportation system, a loop track, one at least of the rails of which is electrically energized, a central station located at a suitable point along the track, a plurality of branch stations at intervals around the loop track, a car on the loop track and means at the central station for indicating the approximate position of the car adapted to be operated electrically from the energized rail.

2. In a transportation system, a loop track, one at least of the rails of which is electrically energized, a plurality of branch stations at intervals around the loop track, a car on the loop track and electrical means at the central station for indicating the approximate position of the car adapted to be operated from the rail.

3. In a transportation system, a loop track having an electrically energized rail, a central station located at a suitable point along the track, a plurality of branch stations at intervals around the loop, a car on the loop track, an indicator at the central station and means operated from the electrically energized rail controlling the indicator.

4. In a transportation system, a loop track having an electrically energized rail, a central station located at a suitable point along the track, a plurality of branch stations at intervals around the loop track, a car on the loop track, an indicator at the central station and mechanism partially on the car and partially attached to the electrically energized rail of the track for operating the indicator.

5. In a transportation system, a loop track having an electrically energized rail, a central station located at a suitable point along the track, a plurality of branch stations at intervals around the loop track, a car on the loop track, an indicator at the central station having a dial provided with numerals equal in number to the branch stations and an indicating hand, and electric means automatically operated by the car controlling the indicating hand.

6. In a transportation system, a loop track having an electrically energized rail, a central station located at a suitable point along the track, a plurality of branch stations at intervals around the loop track, a car on the loop track, an electric indicator at the central station having both an audible alarm and a position indicating device, and means at or near each branch station adapted to be automatically brought into electrical connection with the energized rail to operate the electric indicator.

7. In a transportation system, a loop track having an electrically energized rail, a central station located at a suitable point along the track, a plurality of branch stations at intervals around the loop track, a car on the loop track, an electric indicator at the central station having a bell and an indicating dial and hand, and means at or near each branch station adapted to be automatically brought into electrical connection with the energized rail by the passage of the car to operate the electric indicator.

8. In a transportation system, a loop track having an electrically energized rail, a plurality of stations at intervals around the loop track, a car on the loop track having an electric motor driven from the electrically energized rail, and an electric indicator at at least one of the stations for indicating at said station the approximate position of the car on the track and means for electrically connecting the electric indicator to the electrically energized rail, whereby both the car and indicator are operated by power from the electrically energized rail.

WILLIAM C. CARR.

Witnesses:
  L. M. SANGSTER,
  GEO. A. NEUBAUER.